(12) United States Patent
Wang

(10) Patent No.: US 9,148,605 B1
(45) Date of Patent: Sep. 29, 2015

(54) SENSING DEVICES

(71) Applicant: Himax Imaging Limited, Tainan (TW)

(72) Inventor: Jia-Shyang Wang, Tainan (TW)

(73) Assignee: HIMAX IMAGING LIMITED, Tainan (TW)

( * ) Notice: Subject to any disclaimer, the term of this patent is extended or adjusted under 35 U.S.C. 154(b) by 58 days.

(21) Appl. No.: 14/255,139

(22) Filed: Apr. 17, 2014

(51) Int. Cl.
*H04N 5/378* (2011.01)
*H04N 5/369* (2011.01)
*H04N 5/376* (2011.01)

(52) U.S. Cl.
CPC ............... *H04N 5/378* (2013.01); *H04N 5/369* (2013.01); *H04N 5/3765* (2013.01)

(58) Field of Classification Search
CPC ...... H04N 5/378; H04N 5/369; H04N 5/3765
See application file for complete search history.

(56) References Cited

U.S. PATENT DOCUMENTS

| 8,310,569 | B2 * | 11/2012 | Willassen | 348/245 |
|---|---|---|---|---|
| 2007/0132868 | A1 * | 6/2007 | Lee et al. | 348/308 |
| 2010/0085438 | A1 * | 4/2010 | Richardson | 348/222.1 |
| 2010/0238336 | A1 * | 9/2010 | Okamoto et al. | 348/308 |
| 2012/0038809 | A1 * | 2/2012 | Lee et al. | 348/308 |

* cited by examiner

*Primary Examiner* — Mekonnen Dagnew
(74) *Attorney, Agent, or Firm* — McClure, Qualey & Rodack, LLP

(57) ABSTRACT

A sensing device is provided. The sensing device includes a plurality of pixel groups and a readout circuit. The pixel groups are arranged on a plurality of rows and a plurality of columns to form a pixel array. The pixel groups include a first pixel group and a second pixel group which are arranged on the different rows and the same column. The readout circuit is coupled to the pixel groups. When the first pixel group is triggered to perform a readout operation to generate a first sensing signal, the second pixel group performs a coupling operation to generate a reference signal. The readout circuit performs a subtraction operation based on the first sensing signal and the reference signal to generate a first readout data corresponding to the readout operation of the first pixel group.

15 Claims, 6 Drawing Sheets

SENSING DEVICES

BACKGROUND OF THE INVENTION

1. Field of the Invention

The invention relates to a sensing device, and more particularly, to a sensing device with low power noise.

2. Description of the Related Art

Generally, power noise is a problem in COMS image sensors. Especially, when CMOS image sensors operate at low light conditions, the power noise may affect disadvantageously the sensing quality. Several manners have been provided to reduce the effect of the power noise. In one manner, a low pass filter is used to filter out noise from a power line. However, when an on-chip RC filter is used, high-frequency noise is not easily filtered out. Moreover, if an off-chip RC filter is used for a CMOS image sensor instead of on-chip RC filter, the off-chip RC filter will increases the cost of the COMOS image sensor. In another manner, a regulator is used to generate clear power with low noise. However, high-frequency noise is also not easily filtered out. Thus, the power may still contain some high-frequency noise components.

BRIEF SUMMARY OF THE INVENTION

Thus, it is desired to provide a sensing device which can generate a readout signal with low power noise or without power noise, thereby enhancing sensing quality.

An exemplary embodiment of a sensing device comprises a plurality of pixel groups and a readout circuit. The pixel groups are arranged on a plurality of rows and a plurality of columns to form a pixel array. The pixel groups comprise a first pixel group and a second pixel group which are arranged on the different rows and the same column. The readout circuit is coupled to the pixel groups. When the first pixel group is triggered to perform a readout operation to generate a first sensing signal, the second pixel group performs a coupling operation to generate a reference signal. The readout circuit performs a subtraction operation based on the first sensing signal and the reference signal to generate a first readout data corresponding to the readout operation of the first pixel group.

Another exemplary embodiment of a sensing device comprises a plurality of pixel groups, a plurality of bit line groups, a plurality of sample and hold circuits, a plurality of multiplexer circuits, a plurality of analog-to-digital converter circuits, and a processing circuit. The pixel groups are arranged on a plurality of rows and a plurality of columns to form a pixel array. Each bit line group is the pixel groups arranged on the same column. Each bit line group comprises two bit lines. Each sample and hold circuits is coupled to the pixel groups arranged on the same column through the corresponding bit line group. Each sample and hold circuit comprises two sample and hold banks coupled to the two bit lines of the same bit line group respectively. Each multiplexer circuit is coupled to one of the sample and hold circuits. Each analog-to-digital converter circuit is coupled to one of the multiplexer circuits. Each multiplexer circuit couples the two sample and hold banks of the same sample and hold circuit to the same analog-to-digital converter circuit at different time. The processing circuit is coupled to the analog-to-digital converter circuits. For, among the plurality of pixel groups, two pixel groups arranged on the different rows and the same column, the processing circuit generates a readout data of one of the two pixel groups according to two signals respectively on the two bit lines of the corresponding bit line group.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
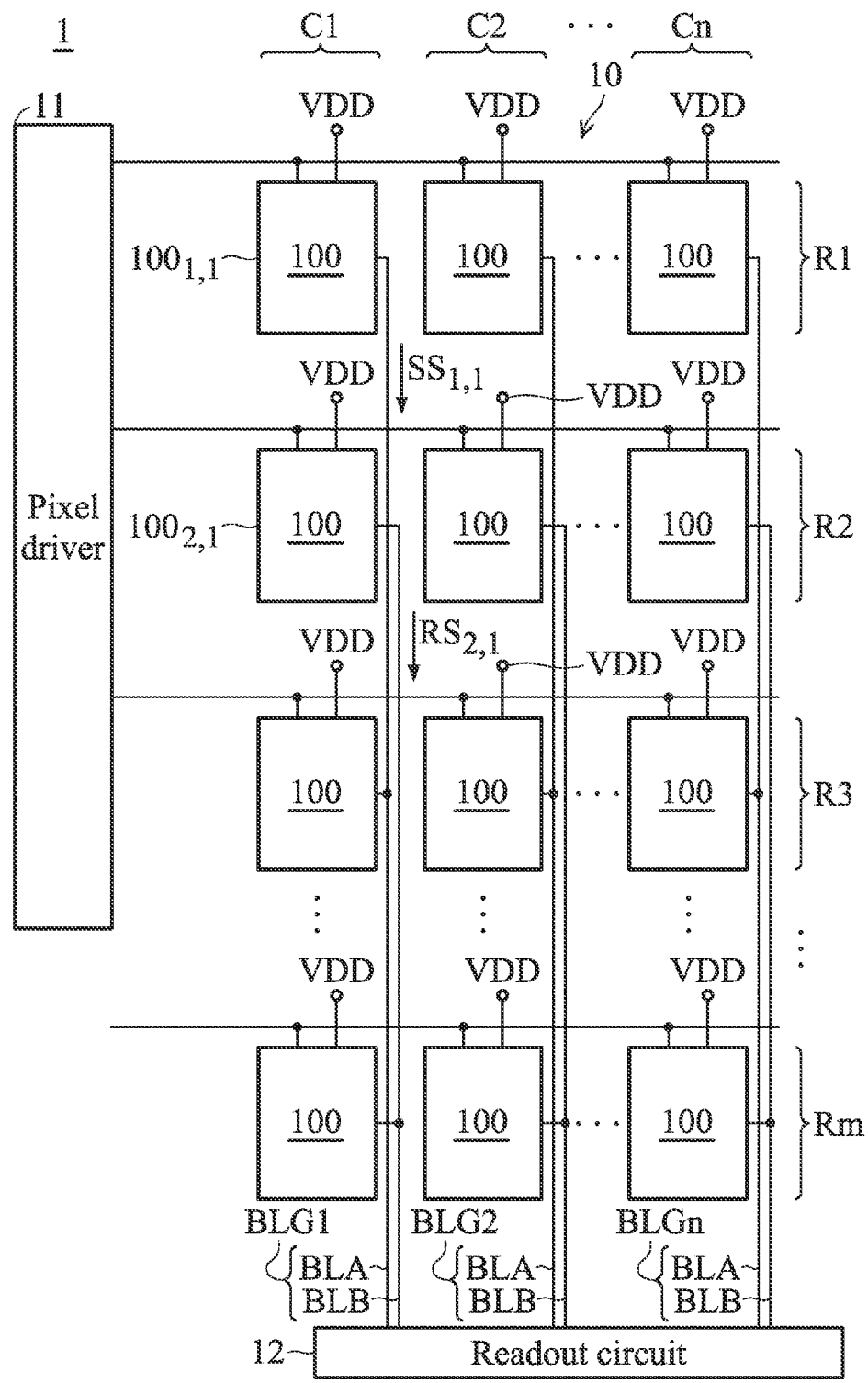
FIG. 1 shows an exemplary embodiment of a sensing device.

Sensing devices are provided. In an exemplary embodiment of a sensing device in FIG. 1, a sensing device 1 comprises a pixel array 10, a pixel driver 11, and a readout circuit 12. As shown in FIG. 1, there are a plurality of pixel groups 100 arranged in rows R1-Rm and column C1-Cn. In the embodiment, m is an even number. The pixel groups 100 are applied by a voltage source VDD. The pixel groups 100 arranged in the same column are coupled to the readout circuit 12 through one bit line group BLG. In the embodiment, each of the bit line groups BLG1-BLGn comprises two bit lines BLA and BLB. Among the pixel groups 100 arranged on the same column, some pixel groups 100 are coupled to the bit line BLA of the corresponding bit line group BLG, and the other some pixel groups 100 are coupled to the bit line BLB of the corresponding bit line group BLG. For example, on the same column, the pixel groups 100 arranged on the odd rows (such as the row R1, R3, R5 . . . ) are coupled to the bit line BLA, while the pixel groups 100 arranged on the even rows (such as the row R2, R4, R6 . . . ) are coupled to the bit line BLB, The pixel driver 11 is used to trigger the pixel groups 100 to perform respective operations, such as a readout operation or a coupling operation. For example, for the same column, when the pixel driver 11 triggers a pixel group 100 which is coupled to the bit line BLA, to perform a readout operation, the pixel driver 11 triggers a pixel group 100, which is coupled to the bit line BLB to perform a coupling operation at the same time. In one embodiment, the pixel group 100 for the coupling operation is arranged a row (such as the row R2) which is adjacent to the row where the pixel group for the readout operation is arranged (such as the row R1). In another embodiment, the pixel group 100 for the coupling operation is arranged a row which is separated from the row where the pixel group for the readout operation is arranged (such as the row R1) by at least two rows (such as the row R4 or R6).

In the following, the pixel group $100_{1,1}$ arranged on the row R1 and the column C1 and the pixel group $100_{2,1}$ arranged on the row R2 (adjacent to the row R1) and the column C1 are given as an example for illustration. When the pixel driver 11 triggers the pixel group $100_{1,1}$ to perform the readout operation, the pixel group $100_{1,1}$ generates a sensing signal $SS_{1,1}$ according to light detection of one specific photo diode in the pixel group $100_{1,1}$. At the same time, the pixel driver 11 triggers the pixel group $100_{2,1}$ to perform the coupling operation. The pixel group $100_{2,1}$ does not generate any sensing signal according to light detection of one photo diode in the pixel group $100_{2,1}$, and, however, the pixel group $100_{2,1}$ generate a reference signal $RS_{2,1}$ according to a voltage at a floating node in the pixel group $100_{2,1}$. The readout circuit 12 receives the sensing signal $SS_{1,1}$ from the pixel group $100_{1,1}$ through the bit line BLA of the bit line group BLG1 and the reference signal $RS_{2,1}$ from the pixel group $100_{2,1}$ through the bit line BLB of the bit line group BLG1. The readout circuit 12 then performs a subtraction operation based on the sensing signal $SS_{1,1}$ and the reference signal $RS_{2,1}$ to generate readout data corresponding to the readout operation of the pixel group $100_{1,1}$. The readout data represents the quantity of the light detected by the specific photo diode in the pixel group $100_{1,1}$.

As described above, the sensing signal $SS_{1,1}$ is generated according to the light detection of the specific photo diode in the pixel group $100_{1,1}$. The sensing signal $SS_{1,1}$ comprises not only a component related to the quantity of the light detected by the specific photo diode but also a component related to power noise of the voltage source VDD. Moreover, since the pixel group $100_{2,1}$ does not generate any sensing signal according to light detection of one photo diode during the coupling operation, the generated reference signal $RS_{2,1}$ comprises only a component related to power noise of the voltage source VDD. When the readout circuit 12 performs the subtraction operation based on the sensing signal $SS_{1,1}$ and the reference signal $RS_{2,1}$, the component related to power noise in the sensing signal $SS_{1,1}$ is counteracted by the component related to power noise in the reference signal $RS_{2,1}$, and the remaining component of the sensing signal $SS_{1,1}$ is the component related to the quantity of the light detected by the specific photo diode in the pixel group $100_{1,1}$. Thus, the readout data generated based on the result of the subtraction operation does not comprise any power noise component. The readout data can represent the quantity of the light detected by the specific photo diode in the pixel group $100_{1,1}$ more accurately.

Similarly, for obtaining the readout data corresponding to a pixel group 100 coupled to the bit line BLB, the pixel driver 11 can trigger the pixel group 100 coupled to the bit line BLB to perform the readout operation, the pixel driver 11 further triggers a pixel group 100 which is coupled to the bit line BLA on the same column to perform the coupling operation at the same time. In one embodiment, the pixel group 100 for the coupling operation is arranged a row (such as the row R1 or R3) which is adjacent to the row where the pixel group for the readout operation is arranged (such as the row R2). In another embodiment, the pixel group 100 for the coupling operation is arranged a row which is separated from the row where the pixel group for the readout operation is arranged (such as the row R2) by at least two rows (such as the row R5 or R7). The operation of the readout circuit 12 of this case is the similar to the previous embodiment, thus omitted here.

Figure 2:
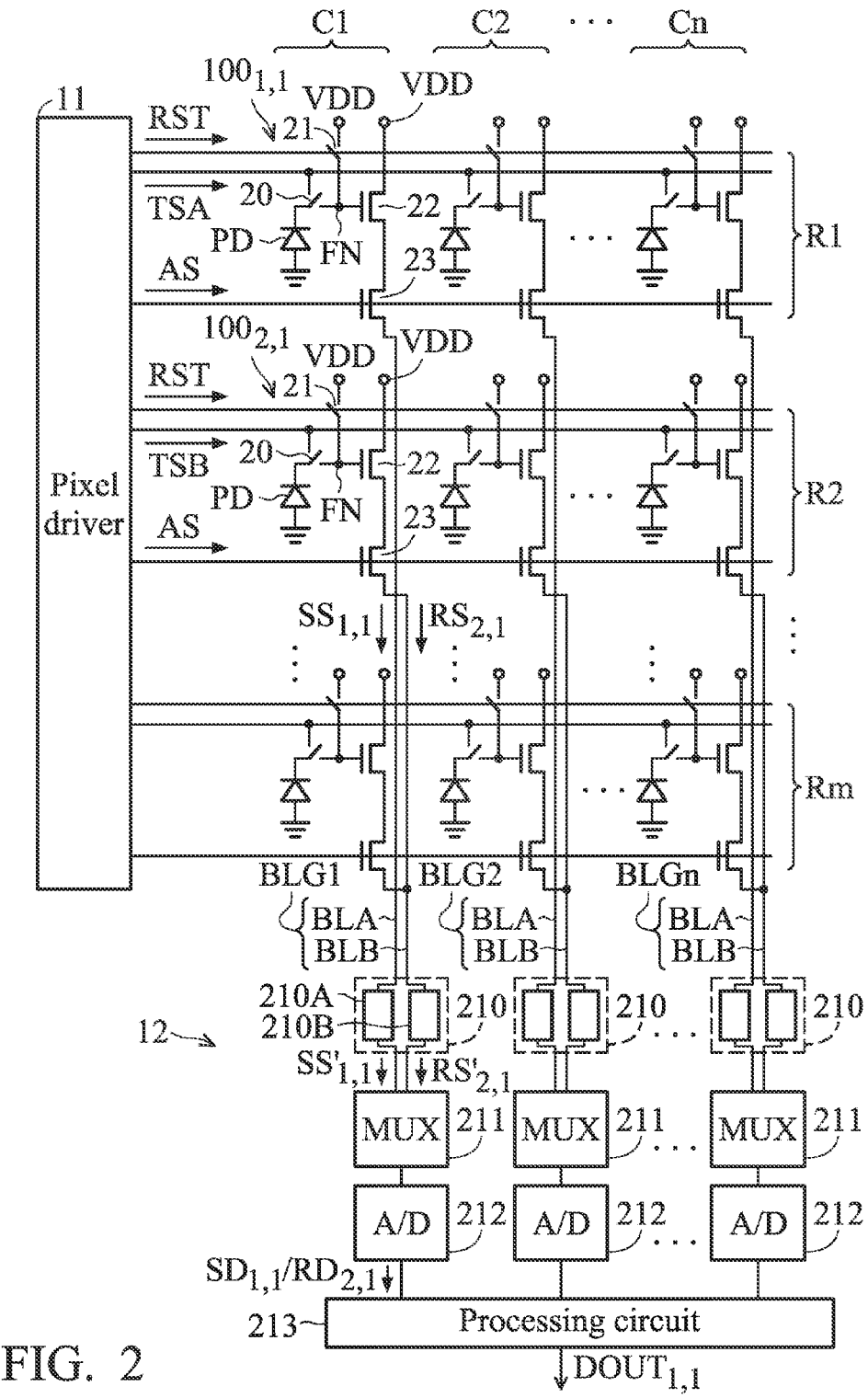
FIG. 2 shows another exemplary embodiment of a sensing device.

In the following, the detailed circuit structure and operations of the pixel groups 100 and the readout circuit 12 will be described in the following. Each of the pixel group 100 comprises at least one photo diode. In the embodiment of FIG. 2, each of the pixel groups 100 comprises one photo diode PD. Each of the pixel groups 100 also comprises a transfer switch 20, a reset switch 21, and output transistors 22 and 23. In each pixel group 100, the transfer switch 20 is coupled between the photo diode PD and a floating node FN and controlled by a trigger signal from the pixel driver 11, and the reset switch 21 is coupled between the voltage source VDD and the floating node FN and controlled by a reset signal RST from the pixel driver 11. Moreover, in each pixel group 100, the gate of the output transistor 22 is coupled to the floating node FN, and the drain there of is coupled to the voltage source VDD. In each pixel group 100, the gate of the output transistor 23 receives an active signal from the pixel driver 11, the drain thereof is coupled to the source of the output transistor 22, and the source thereof is coupled to the corresponding bit line BLA or BLB. Note that, the pixel groups 100 arranged on the same row receives the same trigger signal and the same active signal.

The readout circuit 21 comprises a plurality of sample and hold circuits 210, a plurality of multiplexer circuits (MUX) 211, a plurality of analog-to-digital converter circuits (A/D) 212, and a processing circuit 213. Each of the sample and hold circuits 210 is coupled to one bit line groups BLG and comprises two sample and hold banks 210A and 210B. As shown in FIG. 2, in one sample and hold circuit 210, the sample and hold bank 210A is coupled to bit line BLA of the corresponding bit line group BLG to sample the signal at the corresponding bit line BLA, and the sample and hold bank 210B is coupled to bit line BLB of the corresponding bit line group BLG to sample the signal at the corresponding bit line BLB. Each of the plurality of multiplexer circuits 211 is coupled between one sample and hold circuit 210 and one analog-to-digital converter circuit 212 to transmit the signals respectively sampled by the sample and hold banks 210A and 210B of the corresponding sample and hold circuit 210 to the same analog-to-digital converter circuit 212 at different time.

Figure 3:
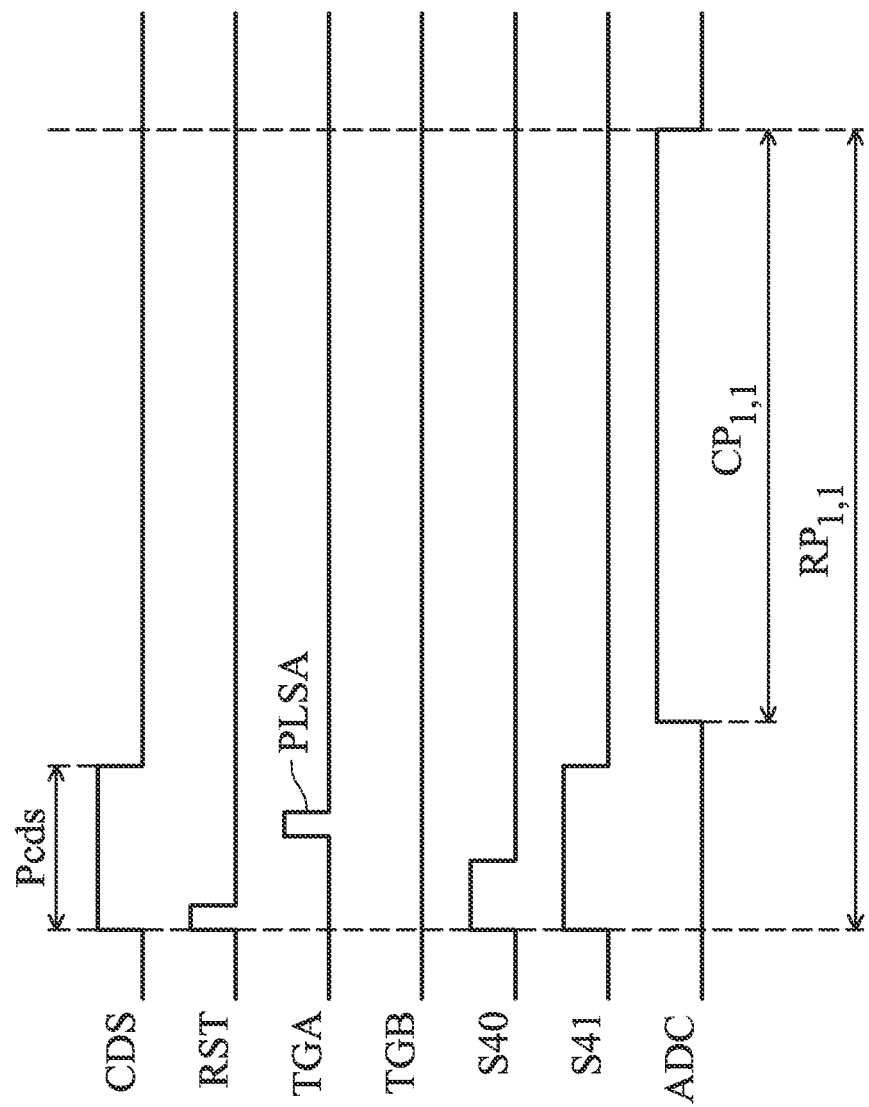
FIG. 3 is a timing chart of main signals of the sensing device of FIG. 2.

By referring to FIGS. 2 and 3, in the case which the readout operation of the pixel group $100_{1,1}$ accompanies the coupling operation of the pixel group $100_{2,1}$, the transfer switch 20 of the pixel group $100_{1,1}$ receives a trigger signal TSA from the pixel driver 11, while the transfer switch 20 of the pixel group $100_{2,1}$ receives a trigger signal TSB from the pixel driver 11. The gates of the output transistors 23 of the pixel groups $100_{1,1}$ and $100_{2,1}$ receive the same active signal AS. In a readout period $RP_{1,1}$ of the pixel group $100_{1,1}$, the output transistors 23 of the pixel groups $100_{1,1}$ and $100_{2,1}$ are turned on by the same active signal AS, and the reset switches 21 of the pixel groups $100_{1,1}$ and $100_{2,1}$ are turned by the reset signal RST to reset the voltage level of the floating nodes FN thereof according to the voltage provided from the voltage source VDD. Then, the transfer switch 20 of the pixel group $100_{1,1}$ is turned on by the trigger signal TSA with a pulse PLSA to trigger the pixel group $100_{1,1}$ for the readout operation. Accordingly, the charge which is generated according to the light detection of the photo diode PD of the pixel group $100_{1,1}$ will change the voltage level of the floating node of the pixel group $100_{1,1}$. The output transistor 22 of the pixel group $100_{1,1}$ operates according to the changed voltage level of the corresponding floating node FN to generate the sensing signal $SS_{1,1}$ provided to the bit line BLA of the bit line group BLG1 through the corresponding turned-on output transistor 23.

However, in the readout period $RP_{1,1}$, the trigger signal TSB does not have any pulse, and thus, the transfer switch 20 of the pixel group $100_{2,1}$ is turned off, such that the pixel group$_{2,1}$ is not triggered for the readout operation. Since the reset switch 21 of the pixel group $100_{2,1}$ is turned on, the turned-on reset transistor 21 couples the voltage from the voltage source VDD to the corresponding floating node FN, that is the voltage level of the floating node FN of the pixel group $100_{2,1}$ is reset according to the voltage provided from the voltage source VDD. At this time, the output transistor 22 of the pixel group $100_{2,1}$ operates according to the reset voltage level of the corresponding floating node FN to generate the reference signal $RS_{2,1}$ provided to the bit line BLB of the bit line group BLG1 through the corresponding turned-on output transistor 23.

For the sample and hold circuit 210 coupled to the bit line group BLG1, the sample and hold bank 210A receives the sensing signal $SS_{1,1}$ through the bit line BLA and performs a sampling operation to the sensing signal $SS_{1,1}$ to generate a sampled sensing signal $SS'_{1,1}$, and the sample and hold bank 210B receives the reference signal $RS_{2,1}$ through the bit line BLB and performs the sampling operation to the reference signal $RS_{2,1}$ to generate a sampled reference signal $RS'_{2,1}$. The multiplexer circuit 211 corresponding to the bit line group BLG1 receives the sampled sensing signal $SS'_{1,1}$ and the sampled reference signal $RS'_{2,1}$ and transmits the sampled sensing signal $SS'_{1,1}$ and the sampled reference signal $RS'_{2,1}$ to the same analog-to-digital converter circuit 212 at different time. As shown in FIG. 3, during a conversion period $CP_{1,1}$ of readout period $RP_{1,1}$, the corresponding analog-to-digital converter circuit 212 performs an analog-to-digital conversion operation (ADC) to the sampled sensing signal $SS'_{1,1}$ and the sampled reference signal $RS'_{2,1}$ from the corresponding sample and hold circuit 212 to respectively generate sensing data $SD_{1,1}$ and reference data $RD_{2,1}$. The processing circuit 213 receives the sensing data $SD_{1,1}$ and reference data $RD_{2,1}$ and performs the subtraction operation to the sensing data $SD_{1,1}$ and the reference data $RD_{2,1}$ to generate a readout data $DOUT_{1,1}$.

As the above description, the sensing signal $SS_{1,1}$ comprises not only a component related to the quantity of the light detected by the specific photo diode but also a component related to power noise of the voltage source VDD. Moreover, the reference signal $RS_{2,1}$ comprises only a component related to power noise of the voltage source VDD. Thus, the sensing data $SD_{1,1}$ also comprises a component related to the quantity of the detected light and a component related to power noise of the voltage source VDD, while the reference $RD_{2,1}$ only comprises a component related to power noise of the voltage source VDD. When the processing circuit 213 performs the subtraction operation to the sensing data $SD_{1,1}$ and the reference data $RD_{2,1}$, the component related to power noise in the sensing data $SD_{1,1}$ is counteracted by the component related to power noise in the reference data $RD_{2,1}$, the remaining component of the sensing data $SD_{1,1}$ is the component related to the quantity of the light detected by the specific photo diode in the pixel group $100_{1,1}$. Thus, the readout data $DOUT_{1,1}$ generated based on the result of the subtraction operation does not comprise any power noise component. That is, the readout data $DOUT_{1,1}$ is free from the power noise of the voltage source VDD. The readout data $DOUT_{1,1}$ can represent the quantity of the light detected by the specific photo diode in the pixel group $100_{1,1}$ more accurately.

Figure 4:
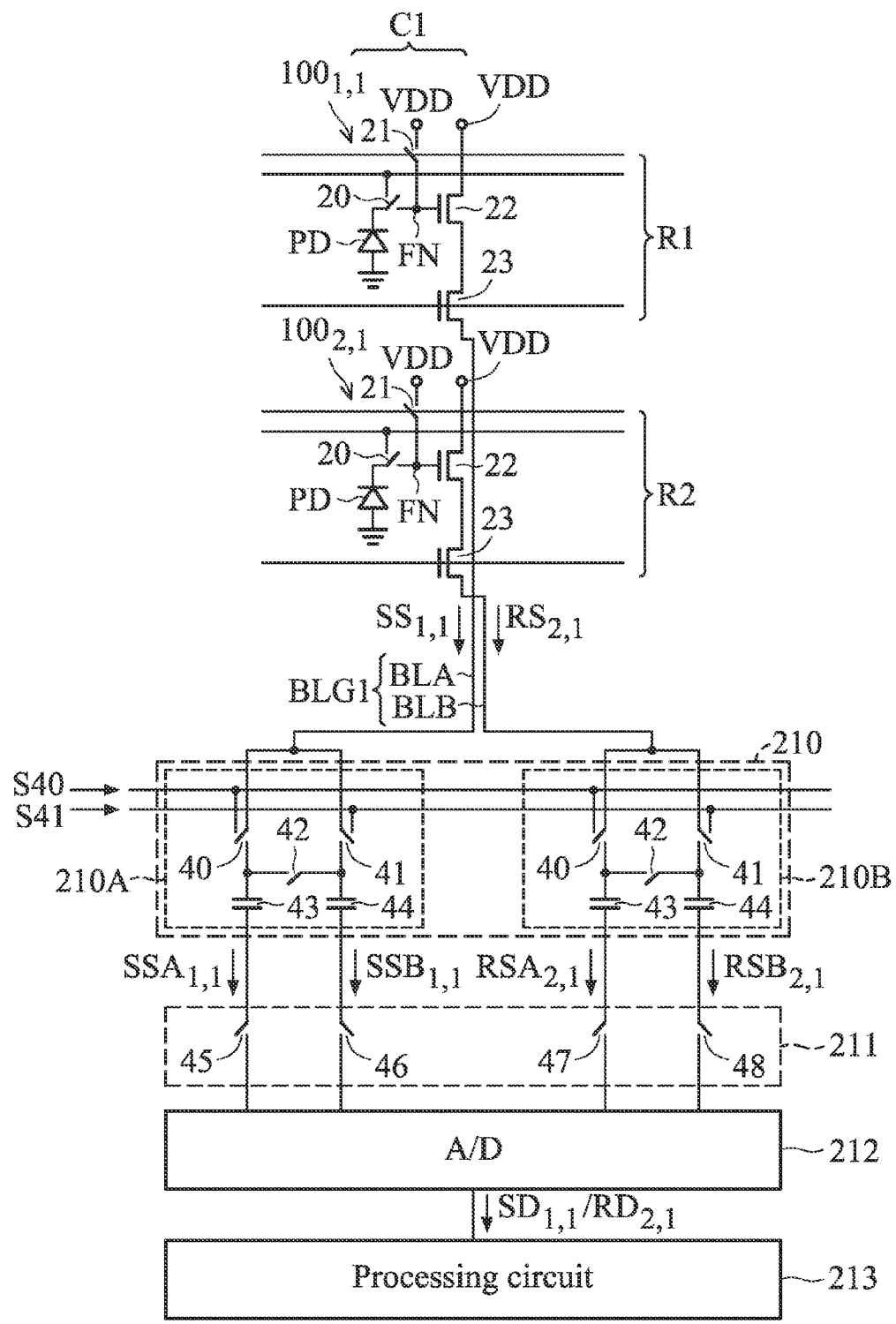
FIG. 4 shows further another exemplary embodiment of a sensing device.

In the embodiment, the sample and hold circuits 210 can be implemented by various circuitry structures. In an embodiment, the sample and hold circuits 210 can perform the sample operation to achieve correlated double sampling. As shown in FIG. 4, for one sample and hold circuit 210, each of the sample and hold banks 210A and 210B comprises three switches 40-42 and two capacitors 43 and 44. The switches 40 and 41 are controlled by control signals S40 and S41 respectively. For clarity, FIG. 4 only shows the pixel groups $100_{1,1}$ and $100_{2,1}$, the corresponding sample and hold circuit 210, the corresponding multiplexer circuit 211, the corresponding analog-to-digital conversion circuit 212, and the processing circuit 213. Referring to FIG. 3 again, CDS represents the operation of the correlated double sampling. During the period Pcds when the correlated double sampling is enabled, the control signals S40 and S41 have different pulse waveforms, that is, the control signals S40 and S41 have different enabled periods. Through the control signals S40 and S41, each sample and hold bank performs the correlated double sampling, such that one signal (a sensing signal or a reference signal) from one bit line is sampled to generate a set of two sub-signals. Each of the multiplexer circuits 211 comprises two switches 45 and 46 used for a set of two sub-signals from the sample and hold bank 210A and also comprises two switches 47 and 48 used for a set of two sub-signals from the sample and hold bank 210B. Two sub-signals of the same set combines to form a sampled signal, such as a sampled sensing signal or a sample reference signal. In the same multiplexer circuit 211, the switches 45 and 46 are turned on at the same time to transmit the sub-signals to the corresponding analog-to-digital converter circuit 212, and the switches 47 and 48 are turned on at the same time to transmit the sub-signals to the corresponding analog-to-digital converter circuit 212.

Referring to FIG. 4, in the sample and hold circuit 210 coupled to the bit line group BLG1, the correlated double sampling is performed by the sample and hold bank 210A for the sensing signal $SS_{1,1}$ to generate two sub-signals $SSA_{1,1}$ and $SSB_{1,1}$, while the correlated double sampling is performed by the sample and hold bank 210B for the reference signal $RS_{2,1}$ to generate two sub-signals $RSA_{2,1}$ and $RSB_{2,1}$. The multiplexer circuit 211 corresponding to the bit line BLA receives the sub-signals $SSA_{1,1}$ and $SSB_{1,1}$ and transmits the sub-signals $SSA_{1,1}$ and $SSB_{1,1}$ to the corresponding analog-to-digital converter circuit 212 through the turned-on switches 45 and 46 at the same time. Moreover, the multiplexer circuit 211 corresponding to the bit line BLB receives the sub-signals $RSA_{2,1}$ and $RSB_{2,1}$ and transmits the sub-signals $RSA_{2,1}$ and $RSB_{2,1}$ to the corresponding analog-to-digital converter circuit 212 at the same time through the turned-on switches 47 and 48. In this embodiment, the sub-signals $SSA_{1,1}$ and $SSB_{1,1}$ combines to form a sampled sensing signal $SS'_{1,1}$, while the two sub-signals $RSA_{2,1}$ and $RSB_{2,1}$ combines to form a sampled reference signal $RS'_{2,1}$. Note that, the time when the sampled sensing signal $SS'_{1,1}$ is transmitted to the analog-to-digital converter circuit 212 is different from the time when the sampled reference signal $RS'_{2,1}$ is transmitted to the analog-to-digital converter circuit 212. In other words, for one bit line group BLG, the time when the switches 45 and 46 of the multiplexer circuit 211 corresponding to the bit line BLA are turned on is different from the time when the switches 47 and 48 of the multiplexer circuit 211 corresponding to the bit line BLB are turned on.

Figure 5A:
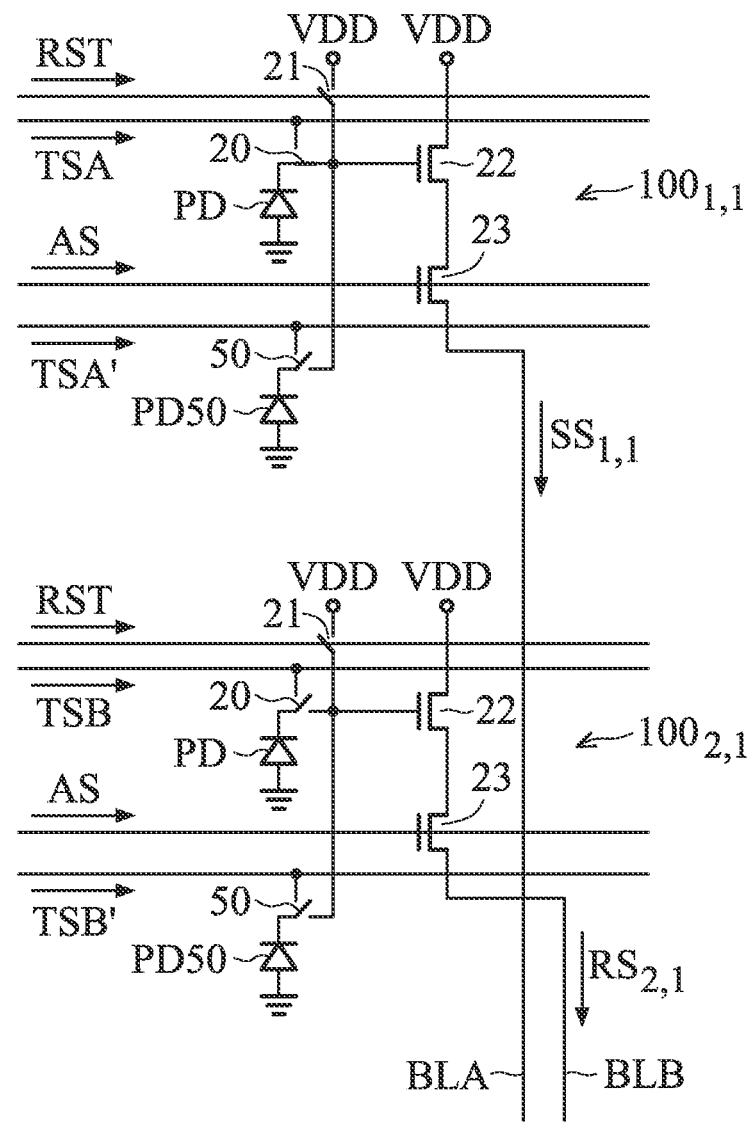
FIGS. 5A and 5B show another exemplary embodiment of a sensing device.
Figure 5B:
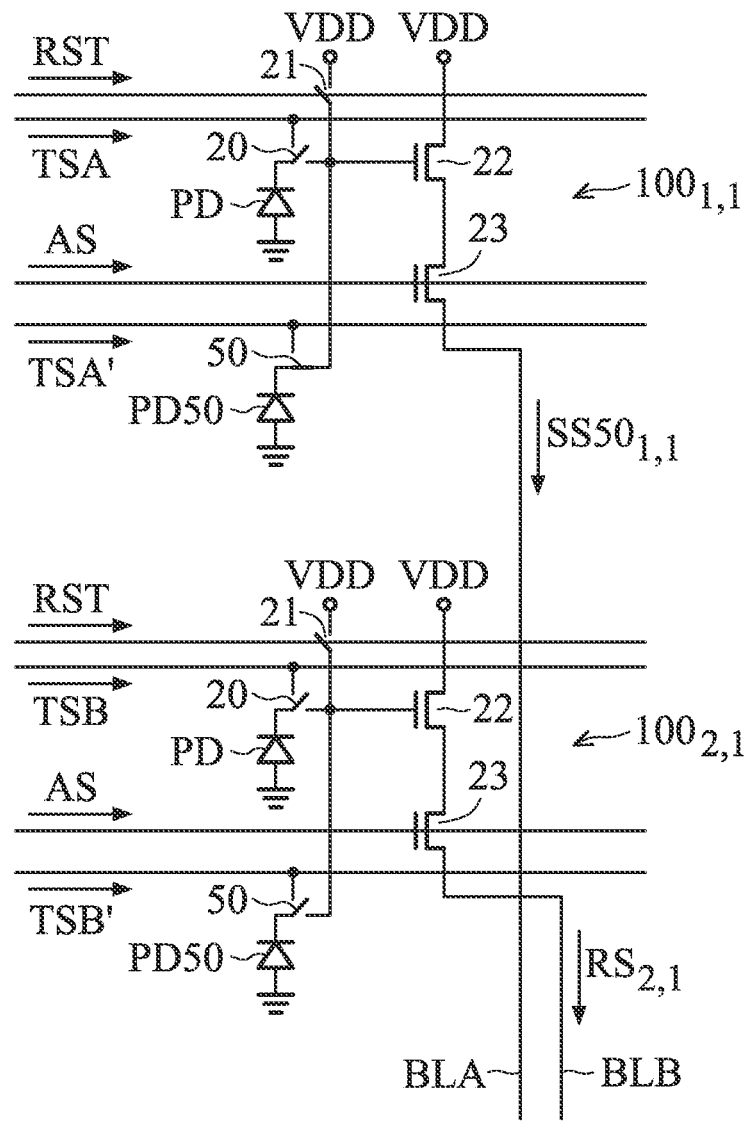

In the above embodiments, there is only one photo diode in each pixel group 100. However, in other embodiments, each pixel group 100 can comprises at least two photo diodes. As shown in FIG. 5A, except the photo diode PD, each pixel group 100 also comprises a photo diode PD50. For clarity, FIG. 5 only shows the pixel groups $100_{1,1}$ and $100_{2,1}$. Due to the arrangement of the photo diode PD50, each pixel group 100 further comprises a transfer switch 50 which is coupled between the photo diode PD50 and the corresponding floating node FN and controlled by another trigger signal TSA' or TSB' from the pixel driver 11. For example, when the pixel driver 11 triggers the pixel group $100_{1,1}$ to perform the readout operation, the pulses of the trigger signals TSA and TSA' used to control the transfer switches 20 and 50 of the pixel group $100_{1,1}$ appear at different time, in other words, the photo diodes PD and PD50 serve as the specific photo diode at different time. When the photo diode PD of the pixel group $100_{1,1}$ serves as the specific photo diode of the pixel group $100_{1,1}$, the transfer switch 20 is turned on, and the sensing signal $SS_{1,1}$ is generated and provided to the readout circuit 12 for the above sample and hold operation, analog-to-digital conversion operation, and subtraction operation, as shown in FIG. 5A. When the photo diode PD50 serves as the specific photo diode of the pixel group $100_{1,1}$, the transfer switch 50 is turned on, and the sensing signal $SS50_{1,1}$ is generated and provided to the readout circuit 12 for the above sample and hold operation, analog-to-digital conversion operation, and subtraction operation, as shown in FIG. 5B. During the appearance the pulse of the trigger signals TSA and TSA', in the pixel group $100_{2,1}$ for the coupling operation, both of the trigger signal TSB and TSB' used to control the transfer switches 20 and 50 of the pixel group $100_{2,1}$ do not have any pulses, and, thus, both of the transfer switches 20 and 50 are turned off. The reference signal $FS_{2,1}$ is generated and provided to the readout circuit 12 for the above sample and hold operation, analog-to-digital conversion operation.

In the above embodiments, the number of photo diodes in each group 100 being one or two is given as an example. The number of photo diodes in each group 100 can be determined according to the system requirements.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A sensing device comprising:
   a plurality of pixel groups arranged on a plurality of rows and a plurality of columns to form a pixel array, wherein the plurality of pixel groups comprise a first pixel group and a second pixel group which are arranged on the different rows and the same column; and
   a readout circuit, coupled to the plurality of pixel groups,
   wherein when the first pixel group is triggered to perform a readout operation to generate a first sensing signal, the second pixel group performs a coupling operation to generate a reference signal, and
   wherein the readout circuit performs a subtraction operation based on the first sensing signal and the reference signal to generate a first readout data corresponding to the readout operation of the first pixel group.

2. The sensing device as claimed in claim 1, wherein the readout circuit comprises:
   a sample and hold circuit, coupled to the first and second pixel groups, performing a sampling operation to the first sensing signal and the reference signal to generate a first sampled sensing signal and a sampled reference signal respectively.

3. The sensing device as claimed in claim 2, wherein the sample and hold circuit performs the sampling operation to achieve correlated double sampling.

4. The sensing device as claimed in claim 2, wherein the readout circuit further comprises:
   an analog-to-digital converter circuit;
   a multiplexer circuit, coupled between the sample and hold circuit and the analog-to-digital converter circuit, transmitting the first sampled hold circuit to the analog-to-digital converter circuit at the different time,
   wherein the analog-to-digital converter circuit performs an analog-to-digital conversion operation to the first sampled sensing signal and the sampled reference signal to generate first sensing data and reference data, respectively, and
   wherein the first readout data is generated according to difference between the first sensing data and the reference data.

5. The sensing device as claimed in claim 4, wherein the readout circuit further comprises:
   a processing circuit receiving the first sensing data and the reference data and performing the subtraction operation to the first sensing data and the reference data to generate the first readout data.

6. The sensing device as claimed in claim 1 further comprising:
   a pixel driver coupled to the plurality of pixel groups,
   wherein when the pixel driver triggers the first pixel group to perform the readout operation, the pixel driver triggers the second pixel group to perform the coupling operation.

7. The sensing device as claimed in claim 1, wherein the row where the first pixel group is arranged is adjacent to the row where the second pixel group is arranged.

8. The sensing device as claimed in claim 1, wherein among the plurality of the rows, at least two rows are arranged between the row where the first pixel group is arranged and the row where the second pixel group is arranged.

9. The sensing device as claimed in claim 1, wherein the plurality of pixel groups are applied by a voltage source, and the subtraction operation is performed to free the first readout data from power noise of the voltage source.

10. A sensing device comprising:
    a plurality of pixel groups arranged on a plurality of rows and a plurality of columns to form a pixel array
    a plurality of bit line groups, each coupled to the plurality of pixel groups arranged on the same column, wherein each of the plurality of bit line groups comprises two bit lines;
    a plurality of sample and hold circuits, each coupled to the pixel groups arranged on the same column through the corresponding bit line group, wherein each of the plurality of sample and hold circuits comprises two sample and hold banks coupled to the two bit lines of the same bit line group respectively;
    a plurality of multiplexer circuits, each coupled to one of the plurality of sample and hold circuits;
    a plurality of analog-to-digital converter circuits, each coupled to one of the plurality of multiplexer circuits, wherein each of the plurality of multiplexer circuits couples the two sample and hold banks of the same sample and hold circuit to the same analog-to-digital converter circuit at different time; and
    a processing circuit coupled to the plurality of analog-to-digital converter circuits;
    wherein for, among the plurality of pixel groups, two pixel groups arranged on the different rows and the same column, the processing circuit generates a readout data of one of the two pixel groups according to two signals respectively on the two bit lines of the corresponding bit line group.

11. The sensing device as claimed in claim 10, wherein each of the plurality of sample and hold circuits performs a correlated double sampling operation.

12. The sensing device as claimed in claim 10 further comprising:
    a pixel driver coupled to the plurality of pixel groups,
    wherein when the pixel driver triggers one of the two pixel groups to perform a readout operation, the pixel driver triggers the other of the two pixel groups to perform a coupling operation.

13. The sensing device as claimed in claim 10, for the two pixel groups arranged on the different rows and the same column, the row where the one of the two pixel groups is arranged is adjacent to the row where the other of the two pixel groups is arranged.

14. The sensing device as claimed in claim 10, wherein for the two pixel groups arranged on the different rows and the same column, among the plurality of the rows, at least two rows are arranged between the row where the one of the two pixel groups is arranged and the row where the other of the two pixel groups is arranged.

15. The sensing device as claimed in claim 10, wherein the plurality of pixel groups are applied by a voltage source, and for the two pixel groups arranged on the different rows and the same column, the readout data is free from power noise of the voltage source.

* * * * *